(12) United States Patent
Sherman et al.

(10) Patent No.: US 9,519,096 B2
(45) Date of Patent: Dec. 13, 2016

(54) PRESSURE SENSITIVE ADHESIVE LIGHT GUIDES

(71) Applicant: 3M INNOVATIVE PROPERTIES COMPANY, St. Paul, MN (US)

(72) Inventors: Audrey A. Sherman, St. Paul, MN (US); Corinne E. Lipscomb, St. Paul, MN (US); Steven D. Solomonson, Shoreview, MN (US); Arlin L. Weikel, Roberts, WI (US); Maureen A. Kavanagh, Stanchfield, MN (US); Kevin R. Schaffer, Woodbury, MN (US); Michael A. Meis, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/572,848

(22) Filed: Dec. 17, 2014

(65) Prior Publication Data

US 2015/0177441 A1    Jun. 25, 2015

Related U.S. Application Data

(60) Provisional application No. 61/919,872, filed on Dec. 23, 2013.

(51) Int. Cl.
*F21V 7/04* (2006.01)
*F21V 8/00* (2006.01)

(52) U.S. Cl.
CPC .................................. *G02B 6/0065* (2013.01)

(58) Field of Classification Search
CPC ... G02B 6/0065; G02B 6/0033; G02B 6/0063; G02B 6/0035; G02B 6/0038

USPC ..... 362/606, 600, 629, 618, 627, 97.1, 97.2, 362/97.3, 97.4
See application file for complete search history.

(56) References Cited

U.S. PATENT DOCUMENTS

| | | | |
|---|---|---|---|
| 6,224,955 B1 * | 5/2001 | Gorski | B42D 3/004 206/453 |
| 7,237,396 B1 | 7/2007 | Nichol | |
| 7,463,417 B2 | 12/2008 | Duncan | |
| 7,767,728 B2 | 8/2010 | Lu | |
| 2008/0101087 A1 * | 5/2008 | Hwang | G02B 6/0063 362/619 |
| 2008/0166207 A1 * | 7/2008 | Baltensperger | B42C 9/0006 412/37 |
| 2009/0122229 A1 * | 5/2009 | Kim | G02B 6/0038 349/65 |
| 2011/0273901 A1 | 11/2011 | Nichol | |

(Continued)

FOREIGN PATENT DOCUMENTS

| | | |
|---|---|---|
| JP | 2004-216668 | 8/2004 |
| JP | 2004-244585 | 9/2004 |

(Continued)

*Primary Examiner* — Anh Mai
*Assistant Examiner* — Glenn Zimmerman
(74) *Attorney, Agent, or Firm* — Jeffrey M. Olofson

(57) ABSTRACT

Optical devices include a light source and an optical article, where the optical article is an acid-free, non-yellowing pressure sensitive adhesive light guide. The light source is optically coupled to the light guide such that light emitted by the light source enters the light guide and is transported within the light guide by total internal reflection. The light guide includes a plurality of features oriented to extract light being transported within the light guide.

19 Claims, 1 Drawing Sheet

(56) References Cited

U.S. PATENT DOCUMENTS

| | | | |
|---|---|---|---|
| 2011/0286234 A1 | 11/2011 | Nichol | |
| 2012/0076468 A1* | 3/2012 | Makino | C08F 283/065 |
| | | | 385/142 |
| 2012/0262639 A1* | 10/2012 | Kim | G02B 27/2214 |
| | | | 349/15 |

FOREIGN PATENT DOCUMENTS

| | | | |
|---|---|---|---|
| JP | 4198398 | 12/2008 | |
| JP | 2011-154343 | 8/2011 | |
| JP | 2011-168688 | 9/2011 | |
| JP | 2011-231149 | 11/2011 | |
| WO | 2009-048863 | 4/2009 | |
| WO | 2010-005655 | 1/2010 | |
| WO | 2010-017087 | 2/2010 | |
| WO | 2011-084315 | 7/2011 | |
| WO | 2011-084405 | 7/2011 | |
| WO | 2011-088216 | 7/2011 | |
| WO | 2011-100277 | 8/2011 | |
| WO | 2011-130718 | 10/2011 | |
| WO | 2011-130720 | 10/2011 | |
| WO | 2012-016047 | 2/2012 | |
| WO | WO 2012116199 A1 * | 8/2012 | B82Y 20/00 |

* cited by examiner

PRESSURE SENSITIVE ADHESIVE LIGHT GUIDES

CROSS REFERENCE TO RELATED APPLICATIONS

This application claims priority from U.S. Provisional Application Ser. No. 61/919,872, filed Dec. 23, 2013, the disclosure of which is incorporated by reference in its/their entirety herein.

FIELD OF THE DISCLOSURE

This disclosure relates to pressure sensitive adhesives useful in optical articles and devices, particularly light guides used to facilitate the distribution of light in electronic devices.

BACKGROUND

Light guides are used to facilitate distribution of light from a light source over an area much larger than the light source. Light guides comprise optically transmissive materials and may have different forms such as slab, wedge, and pseudo-wedge forms. Most light guides are designed to accept light at an edge surface and allow this light to propagate by total internal reflection between a back surface and an output surface, toward an opposing edge surface from which the light enters. Light is emitted uniformly from the output surface using extracting features that are positioned in various types of patterns on the output surface.

The desire for light guides that are flexible has led to the use of elastomeric polymers as light guides. In PCT Publication WO 2010/005655 (Sherman et al.) a viscoelastic light guides are described, where the visoelatic light guide may comprise a pressure sensitive adhesive polymer.

SUMMARY

Disclosed herein are optical devices comprising a light source and an optical article, where the optical article comprises an acid-free, non-yellowing pressure sensitive adhesive light guide. The light source is optically coupled to the acid-free, non-yellowing pressure sensitive adhesive light guide such that light emitted by the light source enters the acid-free, non-yellowing pressure sensitive adhesive light guide and is transported within the acid-free, non-yellowing pressure sensitive adhesive light guide by total internal reflection. The acid-free, non-yellowing pressure sensitive adhesive light guide comprises a first plurality of features oriented to extract light being transported within the acid-free, non-yellowing pressure sensitive adhesive light guide.

BRIEF DESCRIPTION OF THE DRAWINGS

The present application may be more completely understood in consideration of the following detailed description of various embodiments of the disclosure in connection with the accompanying drawings.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

Figure 1:
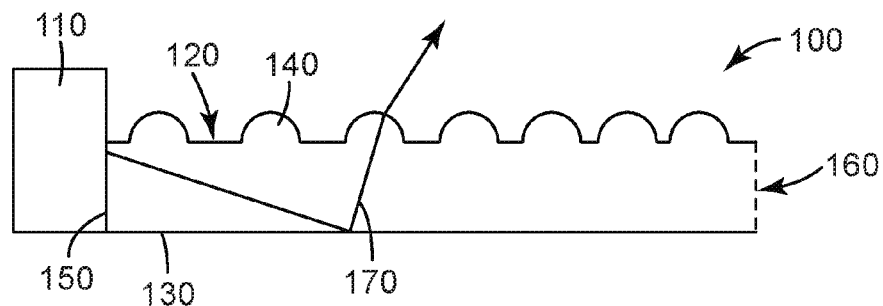
FIG. 1 is a cross sectional view of an embodiment of the present disclosure.

FIG. 1 shows an embodiment of an article of the present disclosure. In FIG. 1, article 100 includes light source 110 in contact with surface 150 of the acid-free, non-yellowing pressure sensitive adhesive light guide 160. Surface 130 of the acid-free, non-yellowing pressure sensitive adhesive light guide 160 is flat, i.e. not structured, and opposite surface 120 is a structured surface comprising a plurality of features 140. FIG. 1 shows light ray 170 which illustrates light propagation by total internal reflection and light extraction by features 140.

Figure 2:
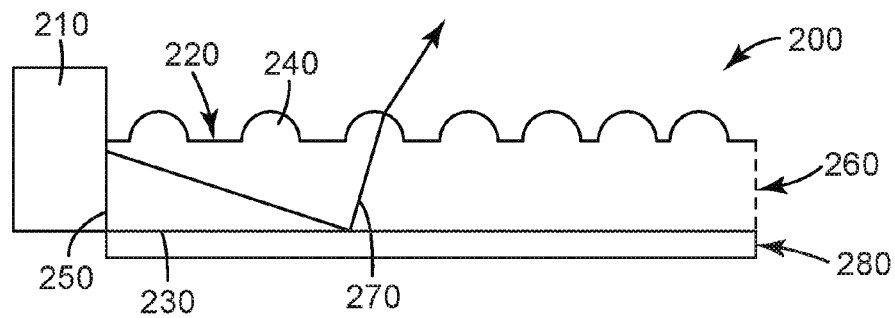
FIG. 2 is a cross sectional view of another embodiment of the present disclosure.

FIG. 2 shows an embodiment of an article of the present disclosure. In FIG. 2, article 200 includes light source 210 in contact with surface 250 of the acid-free, non-yellowing pressure sensitive adhesive light guide 260. Surface 230 of the acid-free, non-yellowing pressure sensitive adhesive light guide 260 is flat, i.e. not structured, and opposite surface 220 is a structured surface comprising a plurality of features 240. Additional layer 280 is in contact with surface 230, and may comprise a layer or a substrate. FIG. 2 shows light ray 270 which illustrates light propagation by total internal reflection and light extraction by features 240.

Figure 3:
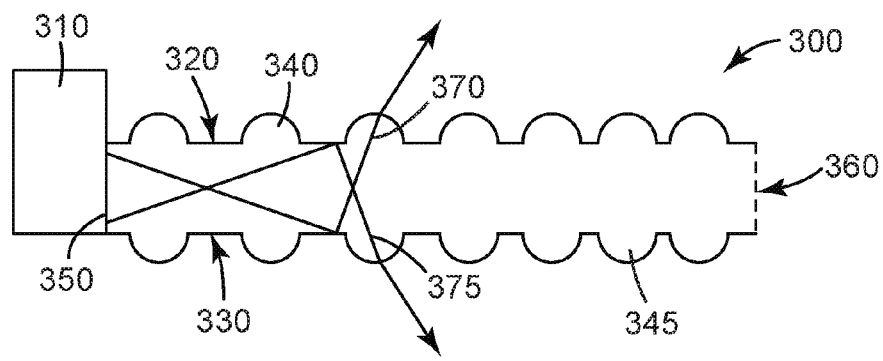
FIG. 3 is a cross sectional view of another embodiment of the present disclosure.

FIG. 3 shows an embodiment of an article of the present disclosure. In FIG. 3, article 300 includes light source 310 in contact with surface 350 of the acid-free, non-yellowing pressure sensitive adhesive light guide 360. Surface 330 of the acid-free, non-yellowing pressure sensitive adhesive light guide 360 is a structured surface comprising a plurality of features 345, and opposite surface 320 is also a structured surface comprising a plurality of features 340. FIG. 3 shows light ray 370 which illustrates light propagation by total internal reflection and light extraction by features 340, and light ray 375 which illustrates propagation by total internal reflection and light extraction by features 345.

Figure 4:
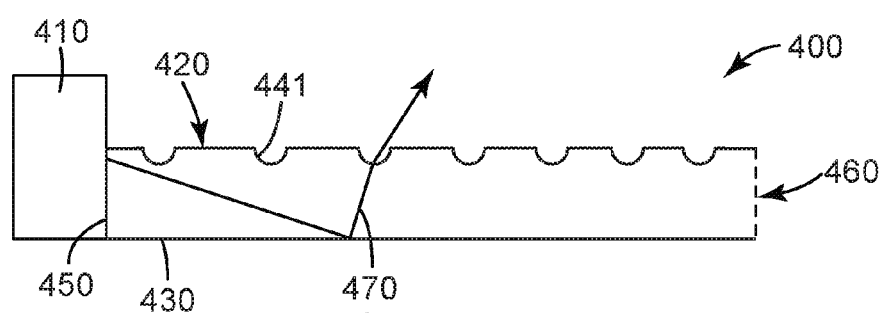
FIG. 4 is a cross sectional view of another embodiment of the present disclosure.

FIG. 4 shows an embodiment of an article of the present disclosure. In FIG. 4, article 400 includes light source 410 in contact with surface 450 of the acid-free, non-yellowing pressure sensitive adhesive light guide 460. Surface 430 of the acid-free, non-yellowing pressure sensitive adhesive light guide 460 is flat, i.e. not structured, and opposite surface 420 is a structured surface comprising a plurality of nanovoids 441 (not drawn to scale). FIG. 4 shows light ray 470 which illustrates light propagation by total internal reflection and light extraction by nanovoids 441.

DETAILED DESCRIPTION

The optical devices disclosed herein include a light source that emits light, and the light is managed by an acid-free, non-yellowing pressure sensitive adhesive light guide. The optical device may provide one or more advantages. For example, the acid-free, non-yellowing pressure sensitive adhesive light guide is soft and compliant such that the light source may be easily coupled to the light guide so that light can enter the light guide. Using a pressure sensitive adhesive, which is tacky at room temperature, permits the light source to be coupled to the light guide by adhesion. This may facilitate assembly of the optical device itself or constructions in which the device is used. Additionally, having a light guide that is a pressure sensitive adhesive permits the flexible light guide to be adhered at least temporarily to a wide range of substrates when it is used.

Light is typically extracted from the acid-free, non-yellowing pressure sensitive adhesive light guide at one or more desired locations or areas of the light guide. In some embodiments, an extractor may be used to extract light from the acid-free, non-yellowing pressure sensitive adhesive light guide. Again, due to the soft and compliant properties of the acid-free, non-yellowing pressure sensitive adhesive light guide, the extractor may be easily coupled to the light guide so that light can be selectively removed from the light guide. In some embodiments, the extractor can be directly adhered to the light guide without the need for additional materials to bond the two together.

The optical device may be used to provide light anywhere it is desired. The optical articles and optical devices may be designed for interior and/or exterior use. The optical articles and optical devices may be designed for household, commercial and/or industrial use. The optical device may be used and/or provided in a construction so that it is portable, i.e., it is a portable source of light. Lighted tapes, signs, labels, stickers, cut-outs, etc. are examples of portable constructions that may be made using the optical device. The optical device may also be used and/or provided in a more stationary construction such as in an electronic display device.

The optical device may also be used to provide "light on demand", e.g., the light source may be activated only under certain conditions such as when parking a vehicle. The optical device may be used to provide exterior lighting of a vehicle, e.g., for tail lights, replacing tail light cavities and their lighting assemblies and which are very space consuming.

The acid-free, non-yellowing pressure sensitive adhesive light guide can be used in place of a conventional light guide used to light display devices. For example, the acid-free, non-yellowing pressure sensitive adhesive light guide may be used to replace a solid or hollow light guide that distributes light from one or more substantially linear or point light sources. The acid-free, non-yellowing pressure sensitive adhesive light guide can be assembled in a display device without the need for additional materials to bond the light guide to the display device.

The optical device may also be very adaptable, even by a user, so that it can be used in different lighting forms and constructions. For example, the acid-free, non-yellowing pressure sensitive adhesive light guide may be provided in roll or sheet form such that it can be cut into various shapes and sizes. The light source may also be interchangeable with the acid-free, non-yellowing pressure sensitive adhesive light guide, for example, if the light source should become unusable or if a different color of light is desired. Further, if used in a sign construction, graphics can be interchanged, for example, if one would like to update an advertisement.

The optical device may provide many more advantages. The optical device can be used to provide light that is bright, diffuse, uniform and/or concentrated over particular areas. The optical device may provide advantages by being thin, flexible (can be flexed by hand) and/or lightweight, and it may even be conformable to a particular shape and size. The acid-free, non-yellowing pressure sensitive adhesive light guide may be tiled to light large areas which may be made easier if the light guides can be stuck together. Due to its viscoelastic properties, the acid-free, non-yellowing pressure sensitive adhesive light guide may also dampen stresses experienced by the optical device or construction in which the device is used. The acid-free, non-yellowing pressure sensitive adhesive light guide, when disposed on a substrate, may be removable and/or repositionable over time. The optical device may also provide advantages related to cost, because it can be made from commercially available light sources and acid-free, non-yellowing pressure sensitive adhesive materials. Additional advantages are described below.

The optical device disclosed herein comprises an acid-free, non-yellowing pressure sensitive adhesive light guide and a light source. Light is emitted by the light source, enters the acid-free, non-yellowing pressure sensitive adhesive light guide, and propagates, reflects, and/or refracts according to the law of refraction and the principle of total internal reflection. The behavior of light within the viscoelastic light guide may depend on a variety of factors such as the surface structure of the light guide, the presence (or absence) of additional substrate(s) in contact with the viscoelastic light guide, and/or the material compositions of the viscoelastic light guide and any additional substrate(s) in contact with the viscoelastic light guide. In addition, the behavior of light within the viscoelastic light guide may depend on the angular distribution of light that enters the light guide.

The principles of refraction and total internal reflection are well known to one of skill in the light guide arts. An informative summary of refraction and total internal reflection related to light guides is provided in PCT Publication No. 2010/005655 (Sherman et al.). In this publication, titled "Viscoelastic Lightguide" optical devices having a light guide which is a viscoelastic material are presented and described. Among the viscoelastic materials described are pressure sensitive adhesives. However, an issue with viscoelastic materials, such as pressure sensitive adhesives, is that they can yellow upon aging. This yellowing, besides being aesthetically undesirable can be problematic for the light guide because the yellowed pressure sensitive adhesive material does not transmit light as efficiently as the non-yellowed original pressure sensitive adhesive material. Therefore, the development of pressure sensitive adhesive light guide materials that do not yellow upon aging is desirable. However, these non-yellowing light guide materials still need to retain the desirable pressure sensitive adhesive properties, properties such as peel adhesion, tack, and shear holding power (which is reflective of the cohesive strength of the pressure sensitive polymer or polymers). In particular, (meth)acrylate-based pressure sensitive adhesives are particularly desirable. Typically (meth)acrylate-based pressure sensitive adhesives comprise copolymers of one or more alkyl (meth)acrylate monomers and one or more acid-containing monomers. These acid-containing monomers provide reinforcing properties to the pressure sensitive adhesive and give an increase in the cohesive strength. Generally, pressure sensitive adhesives with relatively high cohesive strength make the best light guides.

It has been discovered that using acid-free pressure sensitive adhesive as light guides provides light guides that are non-yellowing. By non-yellowing it is meant that the pressure sensitive adhesive does not substantially yellow upon aging. This is in contrast with acid-containing pressure sensitive adhesives which substantially yellow upon aging. Further description of testing protocols for measuring yellowing and the non-yellowing characteristics of pressure sensitive adhesive light guides of this disclosure are provided in greater detail in the Examples section below.

It is also pointed out that while there has been extensive development of pressure sensitive adhesives for optical applications, not all of these pressure sensitive adhesives are suitable as pressure sensitive adhesive light guides. This is because the typical pressure sensitive adhesives developed for optical applications are developed to have light pass through a thin layer of the pressure sensitive adhesive. For example, many optically clear pressure sensitive adhesives have been developed to adhere optical films to a range of optically clear substrates, from windows, to computer screens, to signs, to handheld electronic devices. In each of these cases, a relatively thin film of adhesive is present in an x-y plane, and light is transmitted through the x-y plane in the z direction. However, in a light guide, to follow the same terminology, the light is transmitted down the x or y direction, or both. Only after the light has traveled the desired distance in the x or y direction is it extracted from the light guide and transmitted in the z direction. Thus while slight yellowing in an optical pressure sensitive adhesive that is adhering a film to a window may be acceptable, yellowing in a light guide can severely impact the light traveling through it.

Therefore, in this disclosure acid-free, non-yellowing pressure sensitive adhesive light guides are presented which fulfill not only the high demands required of pressure sensitive adhesive light guides, but also are non-yellowing. This non-yellowing is at least partially achieved by the use of acid-free polymers in pressure sensitive adhesive light guides. However, as described above, acid monomers are frequently used to provide the desired cohesive strength to the pressure sensitive adhesive polymers. In this disclosure, acid-free pressure sensitive adhesive polymers are described that retain sufficient cohesive strength to be suitable pressure sensitive adhesive light guides.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are pressure sensitive adhesives.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The terms "glass transition temperature" and "Tg" are used interchangeably. Typically Tg values are measure using Differential Scanning calorimetry (DSC) unless otherwise noted.

The term "room temperature" refers to ambient temperature, generally 20-22° C., unless otherwise noted.

The term "(meth)acrylate" refers to monomeric acrylic or methacrylic esters of alcohols. Acrylate and methacrylate monomers or oligomers are referred to collectively herein as "(meth)acrylates". Polymers described as "(meth)acrylate-based" are polymers or copolymers prepared primarily (greater than 50% by weight) from (meth)acrylate monomers and may include additional ethylenically unsaturated monomers.

Unless otherwise indicated, "optically transparent" refers to an article, film or adhesive composition that has a high light transmittance over at least a portion of the visible light spectrum (about 400 to about 700 nm).

Unless otherwise indicated, "optically clear" refers to an adhesive or article that has a high light transmittance over at least a portion of the visible light spectrum (about 400 to about 700 nm), and that exhibits low haze.

The term "wavelength of visible light" as used herein encompasses the wavelengths of the light spectrum that constitutes visible light (about 400 to about 700 nm).

Refractive index is defined herein as the absolute refractive index of a material (e.g., a monomer or the polymerized product thereof) which is understood to be the ratio of the speed of electromagnetic radiation in free space to the speed of the radiation in that material, with the radiation being of sodium yellow light at a wavelength of about 583.9 nanometers (nm). The refractive index can be measured using known methods and is generally measured using an Abbe Refractometer.

The term "adjacent" as used herein when referring to two layers means that the two layers are in proximity with one another with no intervening open space between them. They may be in direct contact with one another (e.g. laminated together) or there may be intervening layers.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The terms "free radically polymerizable" and "ethylenically unsaturated" are used interchangeably and refer to a reactive group which contains a carbon-carbon double bond which is able to be polymerized via a free radical polymerization mechanism.

Disclosed herein are optical devices comprising a light source and an optical article, where the optical article comprises an acid-free, non-yellowing pressure sensitive adhesive light guide. The light source is optically coupled to the acid-free, non-yellowing pressure sensitive adhesive light guide such that light emitted by the light source enters the acid-free, non-yellowing pressure sensitive adhesive light guide and is transported within the acid-free, non-yellowing pressure sensitive adhesive light guide by total internal reflection. The acid-free, non-yellowing pressure sensitive adhesive light guide comprises a first plurality of features oriented to extract light being transported within the acid-free, non-yellowing pressure sensitive adhesive light guide.

As mentioned above, the term "non-yellowing" will be further described by the test methods used to determine the amount of yellowing in the Examples section below. In this context, non-yellowing refers to non-yellowing upon aging and in particular upon exposure to ultra-violet (UV) radiation, heat or combination thereof, conditions which the pressure sensitive adhesive light guides are likely to encounter. As described above, yellowing of the pressure sensitive adhesive light guides is not only aesthetically undesirable, but also can adversely affect the light transmission of the light guide. In traditional pressure sensitive adhesive articles, yellowing is generally not an issue because the articles often have pressure sensitive adhesive layers that are hidden behind a substrate or backing and therefore the yellowing is not noticed by the user. Additionally, traditionally pressure sensitive adhesive layers are quite thin, often 25 micrometers (1 mil) to 51 micrometers (2 mils) in thickness. Even significant yellowing in such thin layers is often not noticeable, or if noticeable it is often inconsequential to the adhesive article. Even in articles where the pressure sensitive adhesive is designed to be optically clear or optically transparent, yellowing may not be an issue. Even though light passes through the adhesive layer, because the adhesive layer is so thin, even if the layer has yellowed, the light is relatively unaffected. This is in contrast to a pressure sensitive adhesive light guide where the light travels through the length of the pressure sensitive adhesive and consequently is significantly affected by yellowing in the pressure sensitive adhesive layer.

While a variety of different types of acid-free, non-yellowing pressure sensitive adhesive polymers are suitable for use as light guides in the optical devices of this disclosure, particularly suitable are (meth)acrylate pressure sensitive adhesives. (Meth)acrylate pressure sensitive adhesives are ones prepared from one or more (meth)acrylate copolymers and may contain optional additional additives. Particularly suitable for use in the light guides of this disclosure are (meth)acrylate pressure sensitive adhesive copolymers prepared from a reaction mixture comprising at least a first monomer, a second monomer, and an initiator.

Examples of suitable first monomers include monoethylenically unsaturated alkyl (meth)acrylate monomers. These monomers are acid free and typically comprise alkyl (meth)acrylate monomers having alkyl groups with from 1-14 carbon atoms. Generally these monomers provide flexibility and tack to the (meth)acrylate copolymers and typically these monomers have a homopolymer Tg of no greater than about 0° C. The alkyl group can optionally contain oxygen atoms in the chain thereby forming ethers or alkoxy ethers, for example. Examples of suitable monomers include 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, 2-octyl acrylate, n-decyl acrylate, isodecyl acrylate, isodecyl methacrylate, and isononyl acrylate. Benzyl acrylate may also be used. Other examples include, poly-ethoxylated or -propoxylated methoxy (meth)acrylates such as acrylates of CARBOWAX (commercially available from Union Carbide) and NK ester AM90G (commercially available from Shin Nakamura Chemical, Ltd., Japan). Especially suitable monoethylenically unsaturated (meth)acrylates include athose with 6-14 carbon atoms. Among the particularly suitable monomers are isooctyl acrylate, 2-ethyl-hexyl acrylate, and 2-octyl acrylate.

Examples of suitable second monomers are a wide variety of acid-free reinforcing monomers. Typically these monomers have a higher homopolymer Tg than the monomers described above, generally at least about 20° C. Often the homopolymer Tg of these monomers is in the range of about 20° C. to about 50° C., but in some instances the homopolymer Tg may be even higher. Often the second monomer is also a base-free monomer as well as being an acid-free monomer, meaning that the monomer is free of basic functional groups as well as being free of acid functional groups.

One class of suitable monomers for use as the second monomer are (meth)acrylate monomers comprising at least one hydroxyl group. Examples of (meth)acrylate monomers comprising at least one hydroxyl group include, for example, 2-hydroxyethyl acrylate, 2-hydroxyethyl methacrylate, 3-hydroxypropyl acrylate, 3-hydroxypropyl methacrylate, 4-hydroxybutyl acrylate or a combination thereof.

Examples of other suitable monomers useful as the second monomer include, for example, the (meth)acrylate monomers 2,2-(diethoxy)ethyl acrylate, methyl methacrylate, isobornyl acrylate, 2-(phenoxy)ethyl acrylate, 2-(phenoxy)ethyl methacrylate, biphenylyl acrylate, tert-butylphenyl acrylate, cyclohexyl acrylate, dimethyladamantyl acrylate, 2-naphthyl acrylate, phenyl acrylate, or combinations thereof.

In some embodiments, the (meth)acrylate copolymer is formulated to have a resultant Tg of less than about 0° C. Such (meth)acrylate copolymers typically include about 60 to about 98% by weight of first monomer and about 2 to about 40% by weight of second monomer, where the % by weight is relative to the total monomer composition. When the composition first monomer and second monomer are described, of course it is meant the first monomer can comprise a mixture of monomers, and similarly the second monomer can comprise a mixture of monomers. In some embodiments, the (meth)acrylate copolymer has about 85 to about 98% by weight of first monomer and about 2 to about 15% by weight of second monomer.

The reaction mixture also comprises an initiator to initiate polymerization of the monomers to form the copolymer. A wide range of initiators are suitable including both thermal initiators and photoinitiators. In some embodiments the initiator comprises a photoinitiator. Photoinitiators which are useful according to this disclosure include, but are not limited to, those selected from benzoin ethers, such as benzoin methyl ether or benzoin isopropyl ether; substituted benzoin ethers, such as anisole methyl ether; substituted acetophenones, such as 2,2-diethoxyacetophenone and 2,2-dimethoxy-2-phenyl acetophenone; substituted alpha-ketols, such as 2-methyl-2-hydroxy propiophenone; aromatic sulfonyl chlorides, such as 2-naphthalene sulfonyl chloride; and, photoactive oximes, such as 1-phenyl-1,2-propane-dione-2-(ethoxycarbonyl)oxime. Typically, the initiator is present in an amount of about 0.05% to about 5.0% by weight based upon the total weight of the monomers. Particularly suitable photoinitiators include: 2,2-Dimethoxy-1,2-diphenylethan-1-one, commercially available from Ciba/BASF, Hawthorne, N.Y. as "IRGACURE 651"; 2-Hydroxy-2-methyl-1-phenyl-propane-1-one, commercially available from Ciba/BASF, Hawthorne, N.Y. as "DAROCUR 1173"; 2,4,6-trimethylbenzoyldiphenyl phosphine oxide, commercially available from Ciba/BASF, Hawthorne, N.Y. as "LUCIRIN TPO"; 1-hydroxy-cyclohexyl-phenyl-ketone, commercially available from Ciba/BASF, Hawthorne, N.Y. as "IRGACURE 184"; and Bis(2,4,6-trimethylbenzoyl)-phenylphosphineoxide commercially available from Ciba/BASF, Hawthorne, N.Y. as "IRGACURE 819".

In some embodiments it may be desirable that the acid-free, non-yellowing pressure sensitive adhesive be crosslinked. This crosslinking can be achieved by adding one or more crosslinking agents to reactive mixture used to form the (meth)acrylate copolymer. One class of useful crosslinking agents include multifunctional (meth)acrylate species. Multifunctional (meth)acrylates include tri(meth)acrylates and di(meth)acrylates (that is, compounds comprising three or two (meth)acrylate groups). Typically di(meth)acrylate crosslinkers (that is, compounds comprising two (meth)acrylate groups) are used. Useful tri(meth)acrylates include, for example, trimethylolpropane tri(meth)acrylate, propoxylated trimethylolpropane triacrylates, ethoxylated trimethylolpropane triacrylates, tris(2-hydroxy ethyl)isocyanurate triacrylate, and pentaerythritol triacrylate. Useful di(meth)acrylates include, for example, ethylene glycol di(meth)acrylate, diethylene glycol di(meth)acrylate, triethylene glycol di(meth)acrylate, tetraethylene glycol di(meth)acrylate, 1,4-butanediol di(meth)acrylate, 1,6-hexanediol di(meth)acrylate, alkoxylated 1,6-hexanediol diacrylates, tripropylene glycol diacrylate, dipropylene glycol diacrylate, cyclohexane dimethanol di(meth)acrylate, alkoxylated cyclohexane dimethanol diacrylates, ethoxylated bisphenol A di(meth)acrylates, neopentyl glycol diacrylate, polyethylene glycol di(meth)acrylates, polypropylene glycol di(meth)acrylates, and urethane di(meth)acrylates. Particularly suitable crosslinking agents include diacrylate crosslinking agents such as 1,6-hexanediol diacrylate.

The acid-free, non-yellowing pressure sensitive adhesive light guides of this disclosure also comprise a first plurality of features oriented to extract light being transported within the acid-free, non-yellowing pressure sensitive adhesive light guide. The plurality of features may comprise protrusions, depressions, or a combination thereof. The plurality of features may also comprise printed patterns, such as dot patterns, graphic patterns, and the like. Exemplary features comprise protrusions and/or depressions having lenticular, prismatic, ellipsoidal, conical, parabolic, pyramidal, square, or rectangular shapes, or a combination thereof. Exemplary dot patterns comprise white pigment that scatters light to create extraction. Features comprising lenses are particularly useful for directing light to a preferred angular distribution. Exemplary features comprising linear prisms or elongated prisms are also particularly useful. Features comprising white dots are particularly useful to extract light in multiple directions through scattering. Other exemplary features comprise protrusions and/or depressions having elongated, irregular, variably sloped lenticular, or random columnar shapes, or a combination thereof. Hybrids of any combination of shapes may be used, for example, elongated parabolic, pyramidal prismatic, rectangular-based prismatic, and rounded-tip prismatic shapes. The features may comprise random combinations of shapes and dots.

Sizes of the features may be described by their overall shapes in three dimensions. In some embodiments, each feature may have a dimension of from about 1 to about 100 micrometers, for example, from about 5 to about 70 micrometers. An acid-free, non-yellowing pressure sensitive adhesive light guide may have features that are all the same shape, but the sizes of the shapes may vary in at least one dimension. An acid-free, non-yellowing pressure sensitive adhesive light guide may also have features that are different shapes, and the sizes of these features may or may not vary in any given dimension.

Surface structures of the features may also be varied. Surface structure of a feature generally refers to the substructure of the feature. Exemplary surface structures include optically smooth surfaces, irregular surfaces, patterned surfaces, or a combination thereof. For an acid-free, non-yellowing pressure sensitive adhesive light guide having a plurality of features, each of the features may have the same surface structure. For an acid-free, non-yellowing pressure sensitive adhesive light guide having a plurality of features, some of the features may have the same surface structure. For an acid-free, non-yellowing pressure sensitive adhesive light guide having a plurality of features, each of the features may have a different surface structure. The surface structure of a feature may vary over portions of the feature.

The features may be randomly arranged, arranged in some type of regular pattern, or both. The distance between features may also vary. The features may be discreet or they may overlap. The features may be arranged in close proximity to one another, in substantial contact with each other, immediately adjacent each other, or some combination thereof. A useful distance between features is up to about 10 micrometers, or from about 0.05 micrometers to about 10 micrometers. The features may be offset with respect to one another, angularly as well as transversely. The areal density of the features may change over the length, width, or both.

The features may be arranged to obtain a desired optical effect. The features may be arranged to extract light uniformly or as a gradient from the acid-free, non-yellowing pressure sensitive adhesive light guide, to hide discrete light sources, or to reduce Moiré.

The features may be used to control the amount and/or direction of light extracted from the acid-free, non-yellowing pressure sensitive adhesive light guide. This can be carried out generally by varying the shape, size, surface structure, and/or orientation of the features. If a plurality of features is used, then the number and/or arrangement of the features may be varied, as well as the orientation of the features relative to each other.

In general, one may determine theoretically how varying the orientation of each feature can affect the amount and distribution of light that may be extracted from the acid-free, non-yellowing pressure sensitive adhesive light guide. This may be carried out using ray tracing techniques consistent with the law of refraction and the principle of total internal reflection.

The shape of a feature may change the angular component of light which can increase or decrease the amount of light extracted from the acid-free, non-yellowing pressure sensitive adhesive light guide. This may be the case if light propagates by total internal reflection within the acid-free, non-yellowing pressure sensitive adhesive light guide and strikes a surface of a feature at an angle less than, equal to, or greater than the critical angle for the acid-free, non-yellowing pressure sensitive adhesive light guide and air and/or an adjacent substrate(s). The amount of light extracted from the acid-free, non-yellowing pressure sensitive adhesive light guide may increase or decrease accordingly.

The size of a feature may be changed such that more or less light can reflect off a surface of the feature, thus increasing or decreasing the amount of light extracted from the acid-free, non-yellowing pressure sensitive adhesive light guide.

The surface structure of a feature may be used to control the distribution of light that is extracted from the acid-free, non-yellowing pressure sensitive adhesive light guide. Light having a particular angular distribution may strike a feature and be extracted uniformly and/or randomly from the acid-free, non-yellowing pressure sensitive adhesive light guide. Light may also be extracted uniformly and in a pattern, or randomly and in a pattern.

In some embodiments, it may desirable that the plurality of features oriented to extract light from the acid-free, non-yellowing pressure sensitive adhesive light guide comprises a nanovoided polymeric layer comprising a plurality of interconnected nanovoids. These nanovoided polymeric layers are described in PCT Publication No. WO 2010/017087 (Sherman et al.). In particular, the nanovoided polymeric layer is described as having an effective index, defined as the volume weighted average of the refractive indices of the voids and the polymeric binder.

Differences between the refractive index of the acid-free, non-yellowing pressure sensitive adhesive and the effective index of the nanovoided polymeric layer may be made by appropriate selection of materials and characteristics of the voids. The acid-free, non-yellowing pressure sensitive adhesive may have a refractive index greater than the effective index of the nanovoided polymeric layer. The refractive index of the acid-free, non-yellowing pressure sensitive adhesive may be greater than about 0.002, greater than about 0.005, greater than about 0.01, greater than about 0.02, greater than about 0.03, greater than about 0.04, greater than about 0.05, greater than about 0.1, greater than about 0.2, greater than about 0.3, greater than about 0.4, or greater than about 0.5, as compared to the effective index of the nanovoided polymeric layer.

The acid-free, non-yellowing pressure sensitive adhesive may have a refractive index less than the effective index of the nanovoided polymeric layer. The refractive index of the viscoelastic layer may be less than about 0.002, less than about 0.005, less than about 0.01, less than about 0.02, less than about 0.03, less than about 0.04, less than about 0.05, less than about 0.1, less than about 0.2, less than about 0.3, less than about 0.4, or less than about 0.5, as compared to the effective index of the nanovoided polymeric layer.

The refractive index of the acid-free, non-yellowing pressure sensitive adhesive and the effective index of the nanovoided polymeric layer may be the same or nearly the same such that light can be extracted into the nanovoided polymeric layer with little or no change to the light. The difference between the refractive index of the acid-free, non-yellowing pressure sensitive adhesive and the effective index of the nanovoided polymeric layer may be from about 0.001 to less than about 0.002.

The difference between the refractive index of the acid-free, non-yellowing pressure sensitive adhesive and the effective index of the nanovoided polymeric layer may be from about 0.002 to about 0.5, from about 0.005 to about 0.5, from about 0.01 to about 0.5, from about 0.02 to about 0.5, from about 0.03 to about 0.5, from about 0.04 to about 0.5, from about 0.05 to about 0.5, from about 0.1 to about 0.5, from about 0.2 to about 0.5, from about 0.3 to about 0.5, or from about 0.4 to about 0.5.

In some embodiments, it may be desirable for the acid-free, non-yellowing pressure sensitive adhesive light guide to comprise a second plurality of features oriented to extract light being transported within the acid-free, non-yellowing pressure sensitive adhesive light guide. The second plurality of features oriented to extract light being transported within the acid-free, non-yellowing pressure sensitive adhesive light guide may be located in a variety of locations. In some embodiments, it may be desirable for the second plurality of features to be located on the same side of the light guide as the first plurality of features. In other embodiments, it may desirable for the second plurality of features to be located opposite to the first plurality of features so that light can be extracted in two different directions. Additional pluralities of features are also possible.

The acid-free, non-yellowing pressure sensitive adhesive light guide may have any bulk three-dimensional shape as is desirable for a given application. The acid-free, non-yellowing pressure sensitive adhesive light guide may be in the form of a square or rectangular layer, sheet, film, etc. The acid-free, non-yellowing pressure sensitive adhesive light guide may be cut or divided into shapes as described below. The acid-free, non-yellowing pressure sensitive adhesive light guide light guide may also be tapered such that it is thicker at one end as compared to an opposing end; tapered shapes are sometimes referred to as wedges or pseudo-wedges.

The thickness of the acid-free, non-yellowing pressure sensitive adhesive light guide is not particularly limited as long as it can function as desired. The thickness of the acid-free, non-yellowing pressure sensitive adhesive light guide may be selected based on or in conjunction with the light source. For example, design parameters may limit or even require that a particular light source(s) be used, and there may be a minimum amount, or range of amounts, of light that is required to enter the acid-free, non-yellowing pressure sensitive adhesive light guide. Thus, the thickness of the viscoelastic light guide may be selected so that the required amount of light from a given light source can enter the light guide. A maximum thickness of the acid-free, non-yellowing pressure sensitive adhesive light guide may be required for use in optical devices designed to be particularly thin. Exemplary thicknesses for the viscoelastic light guide range from about 10 micrometers to about 25,400 micrometers (0.4 mil to about 1000 mil), from about 25 micrometers to about 7,600 micrometers (1 mil to about 300 mil), from about 25 micrometers to about 1,500 micrometers (1 mil to about 60 mil), or from about 13 micrometers to about 760 micrometers (0.5 mil to about 30 mil).

The acid-free, non-yellowing pressure sensitive adhesive light guide can be used in a variety of multilayer constructions depending on the particular application. In some of these embodiments, the optical article further comprises an additional layer disposed on the acid-free, non-yellowing pressure sensitive adhesive light guide. A wide variety of suitable additional layers are possible. In some embodiments, the additional layer comprises a substrate. In some embodiments, at least some of the light being transported within the acid-free, non-yellowing pressure sensitive adhesive light guide is emitted from the substrate. The multilayer construction may comprise additional layers or substrates as well.

In some embodiments, the substrate comprises an optically clear substrate having high light transmittance of from about 80 to about 100%, from about 90 to about 100%, from about 95 to about 100%, or from about 98 to about 100% over at least a portion of the visible light spectrum. In some embodiments, the substrate comprises a polymer, such as, for example, poly(meth)acrylate. The substrate may be a reflector that reflects incident light being transported within the viscoelastic light guide. In some embodiments, the reflector comprises a specular reflector wherein light propagating within the acid-free, non-yellowing pressure sensitive adhesive light guide light guide is reflected at a surface of the specular reflector according to the law of reflection.

In other embodiments, the additional layer comprises a multilayer optical film, a reflector, a mirror, a polarizer, a prismatic film, a three-quarter polarizer, a retroreflective film, a touch sensor, polymer, metal, glass, ceramic, a graphic, paper, fabric or a combination thereof.

The light source may comprise any suitable light source. Exemplary light sources include linear light sources such as cold cathode fluorescent lamps and point light sources such as light emitting diode (LEDs). Exemplary light sources also include organic light-emitting devices (OLEDs), incandescent bulbs, fluorescent bulbs, halogen lamps, UV bulbs, infrared sources, near-infrared sources, lasers, or chemical light sources. In general, the light emitted by the light source may be visible or invisible. At least one light source may be used. For example, from 1 to about 10,000 light sources may be used. The light source may comprise a row of LEDs positioned at or near an edge of the viscoelastic light guide. The light source may comprise LEDs arranged on a circuit such that light emitted from the LEDs lights up continuously or uniformly the acid-free, non-yellowing pressure sensitive adhesive light guide light guide throughout a desired area. The light source may comprise LEDs that emit light of different colors such that the colors can mix within the acid-free, non-yellowing pressure sensitive adhesive light guide light guide. In this way, a graphic could be designed to appear differently at different times during its use.

The light source may be powered by any suitable means. The light source may be powered using a battery, a DC power supply, an AC to DC power supply, an AC power supply, or a solar photovoltaic cell.

EXAMPLES

Pressure sensitive adhesives made from non-acid-functional (meth)acrylate copolymers were prepared. The cured compositions are low yellowing (low b* values) and retain this property upon UV and/or heat aging as shown in the following examples.

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company, Milwaukee, Wis. unless otherwise noted. The following abbreviations are used herein: mm=millimeters; cm=centimeters; mL=milliliter; J/cm2=Joules per square centimeter; mJ/cm2=millijoules per square centimeter; phr=parts per hundred; UVA=Ultraviolet A; PSA=Pressure sensitive adhesive.

Materials:

| Abbreviation | Description |
| --- | --- |
| Release Liner | Release Liner, 50 micrometers thick, commercially available from CP Films, Fieldale, VA as "T10 or T50" |
| M1 | Monomer, 2-octyl acrylate (2-OA), as described in Example 1 of U.S. Pat. No. 7,385,020 (Anderson). |
| M2 | Monomer, Isobornyl Acrylate, commercially available from San Esters Corp., New York, New York, as "IBXA" |
| M3 | Monomer, Isooctyl acrylate (IOA) |
| M4 | Monomer, Acrylic acid (AA), commercially available from BASF Corporation, Pasippany, NJ |
| M5 | Monomer, 2-hydroxyethyl acrylate (HEA), commercially available from BASF Corporation, Pasippany, NJ |
| PI1 | Photoinitiator, 2,2-Dimethoxy-1,2-diphenylethan-1-one, commercially available from Ciba/BASF, Hawthorne, NY as "IRGACURE 651" |
| PI2 | Photoinitiator, 2-Hydroxy-2-methyl-1-phenly-propane-1-one, commercially available from Ciba/BASF, Hawthorne, NY as "DAROCUR 1173" |
| PI3 | Photoinitiator, 2, 4, 6-trimethylbenzoyldiphenyl phosphine oxide, commercially available from Ciba/BASF, Hawthorne, NY as "LUCIRIN TPO" |
| PI4 | Photoinitiator, 1-hydroxy-cyclohexyl-phenyl-ketone, commercially available from Ciba/BASF, Hawthorne, NY as "IRGACURE 184" |
| PI5 | Photoinitiator, Bis (2,4,6-trimethylbenzoyl)-phenylphosphineoxide commercially available from Ciba/BASF, Hawthorne, NY as "IRGACURE 819" |
| CL1 | Crosslinker, 1,6-Hexanediol diacrylate, commercially available from Sartomer. Exton, PA as "SR238" |
| C1 | Poly(methylmethacrylate), commercially available from Crown Plastics Inc., Plymouth, MN, as Clear OPTIX Acrylic Film. |
| C2 | Poly(carbonate), commercially available from Tekra, New Berlin, WI as "LEXAN 8010", part number 11316-10#167497 |

Test Methods

Yellowing Test Method

Isopropyl alcohol (IPA) was dispensed unto a 2 inch by 3 inch glass microscopic slide, wiped to dryness with a clean KIMWIPE, repeated for a total of three washes with IPA and allowed to air dry. A 2 inch (5.1 cm) by 3 (7.6 cm) inch strip of adhesive was adhered to the glass microscopic slide by rolling twice in each direction with a roller. Samples were then measured on a CIELAB color scale for b* using a ULTRASCANPRO spectrophotometer (commercially available from HunterLab, Reston, Va.). Samples were measured under four conditions and defined as follows:
1. Initial—adhesive measured with no UV or heat age.
2. UV—adhesive treated with 1.81 J/cm$^2$ of UVA light as measured by a Power Puck obtained from EIT LLC (Sterling, Va.) from a fusion H bulb using a Model DRS-120 Fusion processor (Fusion UV Systems, INC. Gaithersburg, Md.) and measured after 24 hrs after UV exposure.
3. Heat—adhesive aged at 100° C. for 1 week in a Despatch LFD Series oven (Despatch Industries, Minneapolis, Minn.) and measured 24 hrs after removal from oven
4. UV and Heat—combination of UV (2) followed by Heat (3)

Samples were run in at least duplicate and averaged for reporting in the Tables below.

ADHESIVE EXAMPLES

Adhesive samples were prepared by mixing the monomers with photoinitiator and crosslinker. The compositions, when cured were tested for yellowing as described above. Results are shown in the following Tables.

PSA Examples PSA1 Through PSA31 and Comparative C1 Through C26

A quart (about 500 mL) jar was charged with:
1) isooctyl acrylate (M3) or 2-octyl acrylate (M1),
2) 2-Hydroxy-2-methyl-1-phenly-propane-1-one (PI2, 0.04 phr), 2,4,6-trimethylbenzoyldiphenyl phosphine oxide (PI3, 0.04 phr), 1-hydroxy-cyclohexyl-phenyl-ketone (PI4, 0.04 phr), 2,2-Dimethoxy-1,2-diphenyle-than-1-one (PI1, 0.04 phr) or Bis(2,4,6-trimethylbenzoyl)-phenylphosphineoxide (PI5, 0.04 phr) photoinitiator,
And optionally,
3) acrylic acid (M4), 2-hydroxyethyl acrylate (M5), or isobornyl acrylate (M2).

The monomer mixtures, as shown in each Table, were purged with nitrogen for 10 minutes then exposed to low intensity ultraviolet radiation until a coatable syrup copolymer was prepared, after which an additional (0.16 phr) of the corresponding photoinitiator and 1,6-hexanediol diacrylate (CL1, 0.1 or 0.3 weight percent) crosslinker were added. The pre-adhesives formulations were then coated between two Release Liners at a 50 mil (1.3 mm) thickness and cured by UVA light at 1900-2500 mJ/cm$^2$.

Control examples using current optical grade light guide materials, poly(methylmethacrylate) (PMMA Example C1) at 80 mils (2.0 mm) thickness and poly(carbonate) (PC Example C2) at 20 mils (0.5 mm) thickness, were prepared. Additionally, all examples mentioned above that contain M4 are PSA control examples (C3 through C26) that show the yellowing exhibited by acid containing PSAs.

Aging was performed and yellowing was measured for samples prepared from pre-adhesive syrup as described in the yellowing test method above. The yellowing data are shown in Tables 1-5 below.

TABLE 1

CM1 used with increasing M4 content with PI1, PI2, PI3, PI4. CL1 was used at 0.1 phr.

| Sample | Monomer (1) M1 | Monomer (2) M4 | PI (3) | b* (Initial) | b* (UV) | b* (Heat) | b* (UV and Heat) |
|---|---|---|---|---|---|---|---|
| C1 | N/A | N/A | N/A | 0.11 | 0.12 | 0.11 | 0.14 |
| C2 | N/A | N/A | N/A | 0.28 | 0.72 | 0.37 | 0.75 |
| PSA1 | 100 | 0 | PI2 | 0.30 | 0.38 | 0.44 | 0.60 |
| C3 | 99.5 | 0.5 | PI2 | 0.16 | 0.29 | 0.9 | 0.9 |
| C4 | 99 | 1 | PI2 | 0.18 | 0.31 | 0.99 | 1.02 |
| C5 | 95 | 5 | PI2 | 0.21 | 0.36 | 0.98 | 1.55 |
| C6 | 90 | 10 | PI2 | 0.19 | 0.56 | 1.01 | 2.06 |
| PSA2 | 100 | 0 | PI1 | 0.28 | 0.33 | 0.38 | 0.51 |
| C7 | 99.5 | 0.5 | PI1 | 0.18 | 0.27 | 0.53 | 0.72 |
| C8 | 99 | 1 | PI1 | 0.23 | 0.29 | 0.59 | 0.76 |
| C9 | 95 | 5 | PI1 | 0.22 | 0.29 | 0.6 | 1.2 |
| C10 | 90 | 10 | PI1 | 0.34 | 0.37 | 0.84 | 1.88 |
| PSA3 | 100 | 0 | PI4 | 0.28 | 0.22 | 0.47 | 0.51 |
| C11 | 99.5 | 0.5 | PI4 | 0.17 | 0.23 | 0.59 | 0.71 |
| C12 | 99 | 1 | PI4 | 0.15 | 0.29 | 0.71 | 0.77 |
| C13 | 95 | 5 | PI4 | 0.19 | 0.27 | 0.62 | 1.13 |
| C14 | 90 | 10 | PI4 | 0.23 | 0.38 | 0.76 | 1.36 |
| PSA4 | 100 | 0 | PI3 | 0.27 | 0.29 | 0.63 | 0.81 |
| C15 | 99.5 | 0.5 | PI3 | 0.22 | 0.25 | 0.65 | 0.69 |
| C16 | 99 | 1 | PI3 | 0.22 | 0.28 | 0.62 | 0.73 |
| C17 | 95 | 5 | PI3 | 0.28 | 0.36 | 0.62 | 0.86 |
| C18 | 90 | 10 | PI3 | 0.33 | 0.31 | 0.54 | 0.95 |

TABLE 2

M1 used with increasing M5 content with PI1, PI2, PI3, PI4. CL1 was used at 0.1 phr.

| Sample | Monomer (1) M1 | Monomer (2) M5 | PI (3) | b* (Initial) | b* (UV) | b* (Heat) | b* (UV and Heat) |
|---|---|---|---|---|---|---|---|
| PSA5 | 99.5 | 0.5 | PI2 | 0.23 | 0.47 | 0.51 | 0.63 |
| PSA6 | 99 | 1 | PI2 | 0.14 | 0.40 | 0.56 | 0.66 |
| PSA7 | 95 | 5 | PI2 | 0.21 | 0.35 | 0.62 | 0.81 |
| PSA8 | 90 | 10 | PI2 | 0.24 | 0.41 | 0.65 | 0.99 |
| PSA9 | 99.5 | 0.5 | PI1 | 0.21 | 0.36 | 0.38 | 0.49 |
| PSA10 | 99 | 1 | PI1 | 0.23 | 0.38 | 0.40 | 0.54 |
| PSA11 | 95 | 5 | PI1 | 0.24 | 0.32 | 0.41 | 0.62 |
| PSA12 | 90 | 10 | PI1 | 0.23 | 0.37 | 0.52 | 0.75 |
| PSA13 | 99.5 | 0.5 | PI4 | 0.20 | 0.30 | 0.54 | 0.50 |
| PSA14 | 99 | 1 | PI4 | 0.20 | 0.28 | 0.53 | 0.53 |
| PSA15 | 95 | 5 | PI4 | 0.32 | 0.31 | 0.58 | 0.71 |
| PSA16 | 90 | 10 | PI4 | 0.22 | 0.32 | 0.68 | 0.89 |
| PSA17 | 99.5 | 0.5 | PI3 | 0.30 | 0.29 | 0.54 | 0.73 |
| PSA18 | 99 | 1 | PI3 | 0.24 | 0.32 | 0.54 | 0.71 |
| PSA19 | 95 | 5 | PI3 | 0.17 | 0.31 | 0.54 | 0.74 |
| PSA20 | 90 | 10 | PI3 | 0.26 | 0.34 | 0.54 | 0.82 |

TABLE 3

Compare PI2, PI3, and PI1 in a M1/M2 system with 0.3 phr CL1.

| Sample | Monomer (1) M1 | Monomer (2) M2 | PI (3) | b* (Initial) | b* (UV) | b* (Heat) | b* (UV and Heat) |
|---|---|---|---|---|---|---|---|
| PSA21 | 87 | 13 | PI2 | 0.22 | 0.27 | 0.51 | 0.56 |
| PSA22 | 87 | 13 | PI3 | 0.32 | 0.28 | 0.75 | 1.04 |

TABLE 3-continued

Compare PI2, PI3, and PI1 in a M1/M2 system with 0.3 phr CL1.

| Sample | Monomer (1) M1 | Monomer (2) M2 | PI (3) | b* (Initial) | b* (UV) | b* (Heat) | b* (UV and Heat) |
|---|---|---|---|---|---|---|---|
| PSA23 | 76 | 24 | PI2 | 0.22 | 0.30 | 0.60 | 0.63 |
| PSA24 | 76 | 24 | PI3 | 0.32 | — | 0.69 | 0.96 |
| PSA25* | 87 | 13 | PI2 | 0.17 | 0.24 | 0.37 | 0.68 |
| PSA26* | 87 | 13 | PI1 | 0.21 | 0.34 | 0.41 | 0.53 |
| PSA27* | 76 | 24 | PI2 | 0.19 | 0.26 | 0.41 | 0.58 |

*Samples have 0.1 phr CL1

TABLE 4

PI2 vs PI1 used in an M3/M4 or M3/M2 system with 0.1 phr CL1.

| Sample | Monomer (1) M3 | Monomer (2) M4 | Monomer (2) M2 | PI (3) | b* (Initial) | b* (UV) | b* (Heat) | b* (UV and Heat) |
|---|---|---|---|---|---|---|---|---|
| C19 | 95 | 5 | 0 | PI2 | 0.19 | 0.25 | 0.64 | 1.20 |
| C20 | 95 | 5 | 0 | PI1 | 0.20 | 0.31 | 0.54 | 1.19 |
| C21 | 90 | 10 | 0 | PI1 | 0.30 | 0.37 | 0.83 | 1.45 |
| PSA28 | 87 | 0 | 13 | PI2 | 0.24 | 0.28 | 0.45 | 0.47 |
| PSA29 | 87 | 0 | 13 | PI1 | 0.24 | 0.40 | 0.41 | 0.49 |

TABLE 5

Compare PI3, PI5, PI5/PI1 and PI1 in an M3/M4 or M3/M2 system with 0.3 CL1.

| Sample | Monomer (1) M3 | Monomer (2) M4 | Monomer (2) M2 | PI (3) | b* (Initial) | b* (UV) | b* (Heat) | b* (UV and Heat) |
|---|---|---|---|---|---|---|---|---|
| C22 | 95 | 5 | 0 | PI3 | 0.27 | 0.36 | 1.16 | 1.54 |
| C23 | 95 | 5 | 0 | PI5 | 0.26 | 0.33 | 0.98 | 1.55 |
| C24 | 95 | 5 | 0 | PI5/PI1 | 0.20 | 0.33 | 1.27 | 2.02 |
| C25 | 95 | 5 | 0 | PI1 | 0.21 | 0.34 | 1.37 | 1.73 |
| C26 | 90 | 10 | 0 | PI3 | 0.23 | 0.39 | 0.39 | 0.94 |
| PSA30 | 87 | 0 | 13 | PI3 | 0.34 | 0.31 | 1.14 | 1.11 |
| PSA31 | 76 | 0 | 24 | PI3 | 0.32 | — | 1.17 | 1.38 |

What is claimed is:

1. An optical device comprising:
a light source; and
an optical article comprising:
an acid-free, non-yellowing pressure sensitive adhesive light guide, wherein the light source is optically coupled to the acid-free, non-yellowing pressure sensitive adhesive light guide such that light emitted by the light source enters the acid-free, non-yellowing pressure sensitive adhesive light guide and is transported within the acid-free, non-yellowing pressure sensitive adhesive light guide by total internal reflection, and wherein the acid-free, non-yellowing pressure sensitive adhesive light guide comprises a first plurality of features oriented to extract light being transported within the acid-free, non-yellowing pressure sensitive adhesive light guide.

2. The optical device of claim 1, wherein the acid-free, non-yellowing pressure sensitive adhesive light guide does not yellow upon exposure to UV radiation, heat, or a combination thereof.

3. The optical device of claim 1, wherein the acid-free, non-yellowing pressure sensitive adhesive light guide comprises a (meth)acrylate pressure sensitive adhesive, the (meth)acrylate pressure sensitive adhesive being prepared from a reaction mixture comprising:
a first monomer comprising a monoethylenically unsaturated alkyl (meth)acrylate monomer;
a second monomer wherein, the second monomer is an acid-free reinforcing monomer,
and wherein a homopolymer of the second monomer has a Tg of at least about 20° C.; and
at least one initiator.

4. The optical device of claim 1, wherein the acid-free, non-yellowing pressure sensitive adhesive light guide is also a base-free, non-yellowing pressure sensitive adhesive light guide.

5. The optical device of claim 1, wherein the optical article further comprises an additional layer disposed on the acid-free, non-yellowing pressure sensitive adhesive light guide.

6. The optical device of claim 1, further comprising a second plurality of features oriented to extract light being transported within the acid-free, non-yellowing pressure sensitive adhesive light guide, wherein the second plurality of features oriented to extract light being transported within the acid-free, non-yellowing pressure sensitive adhesive light guide is located opposite to the first plurality of features oriented to extract light being transported within the acid-free, non-yellowing pressure sensitive adhesive light guide.

7. The optical device of claim 1, wherein the first plurality of features oriented to extract light being transported within the acid-free, non-yellowing pressure sensitive adhesive light guide comprises a nanovoided polymeric layer comprising a plurality of interconnected nanovoids.

8. The optical device of claim 3, wherein the first monomer comprises a (meth)acrylate monomer having from 1-14 carbon atoms.

9. The optical device of claim 3 wherein the first monomer comprises a (meth)acrylate monomer having 6-14 carbon atoms.

10. The optical device of claim 3, wherein the second monomer comprises a (meth)acrylate monomer comprising at least one hydroxyl group.

11. The optical device of claim 3, wherein the second monomer comprises a (meth)acrylate monomer selected from 2,2-(diethoxy)ethyl acrylate, methyl methacrylate, isobornyl acrylate, 2-(phenoxy)ethyl acrylate, 2-(phenoxy) ethyl methacrylate, biphenylyl acrylate, tert-butylphenyl acrylate, cyclohexyl acrylate, dimethyladamantyl acrylate, 2-naphthyl acrylate, phenyl acrylate, or combinations thereof.

12. The optical device of claim 3, wherein the reactive mixtures comprises 60-95% by weight first monomer; and 2-40% by weight second monomer.

13. The optical device of claim 3, wherein the initiator comprises a photoinitiator.

14. The optical device of claim 3, wherein the reaction mixture further comprises a crosslinker.

15. The optical device of claim 5, wherein the additional layer disposed on the acid-free, non-yellowing pressure sensitive adhesive light guide comprises a substrate.

16. The optical device of claim 5, wherein the additional layer comprises a multilayer optical film, a reflector, a mirror, a polarizer, a prismatic film, a three-quarter polarizer, a retroreflective film, a touch sensor, polymer, metal, glass, ceramic, a graphic, paper, fabric or a combination thereof.

17. The optical device of claim 10, wherein the (meth) acrylate monomer comprising at least one hydroxyl group is selected from 2-hydroxyethyl acrylate, 2-hydroxyethyl methacrylate, 3-hydroxypropyl acrylate, 3-hydroxypropyl methacrylate, 4-hydroxybutyl acrylate, or a combination thereof.

18. The optical device of claim 14, wherein the crosslinker comprises a di-fuctional or higher-functional (meth) acrylate crosslinker.

19. The optical device of claim 15, wherein at least some of the light being transported within the acid-free, non-yellowing pressure sensitive adhesive light guide is emitted from the substrate.

* * * * *

UNITED STATES PATENT AND TRADEMARK OFFICE
CERTIFICATE OF CORRECTION

| | |
|---|---|
| PATENT NO. | : 9,519,096 B2 |
| APPLICATION NO. | : 14/572848 |
| DATED | : December 13, 2016 |
| INVENTOR(S) | : Audrey Sherman et al. |

Page 1 of 1

It is certified that error appears in the above-identified patent and that said Letters Patent is hereby corrected as shown below:

Column 1
Line 36, Delete "visoelatic" and insert -- viscoelastic --, therefor.

Column 6
Line 7, Delete "calorimetry" and insert -- Calorimetry --, therefor.

Column 8
Line 25, Delete "athose" and insert -- those --, therefor.

Column 14
Line 47, Delete "Pasippany,NJ" and insert -- Parsippany, NJ --, therefor.
Line 49, Delete "Pasippany, NJ" and insert -- Parsippany, NJ --, therefor.
Line 52, Delete "-l-phenly-propane-l-one," and insert -- -1-phenly-propane-1-one, --, therefor.

Column 15
Line 24, After "oven" insert -- . --.
Line 26, After "(3)" insert -- . --.
Line 42, Delete "-phenly-" and insert -- -phenyl- --, therefor.

Column 19
Line 20, In Claim 18, delete "di-fuctional" and insert -- di-functional --, therefor.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*